Figure 3:
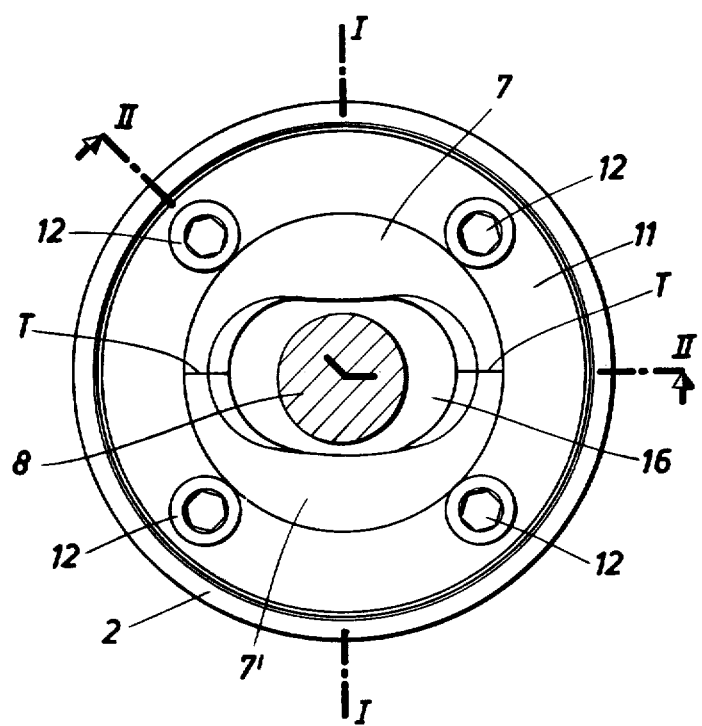

United States Patent [19]
Dolenc et al.

[11] 4,372,179
[45] Feb. 8, 1983

[54] RECIPROCATING-PISTON DRIVE MECHANISM

[75] Inventors: Anton Dolenc; Tomas Visek, both of Vienna, Austria

[73] Assignee: Steyr-Daimler-Puch Aktiengesellschaft, Vienna, Austria

[21] Appl. No.: 58,629

[22] Filed: Jul. 18, 1979

Related U.S. Application Data

[63] Continuation-in-part of Ser. No. 887,502, Mar. 17, 1978, abandoned.

[30] Foreign Application Priority Data

Jan. 25, 1978 [AT] Austria ............................ 519/78

[51] Int. Cl.³ ............................................ F16J 1/24
[52] U.S. Cl. ............................ 74/579 E; 123/193 P; 123/45 R; 92/31; 92/187; 123/193 P;45 R;197 A;197 AB
[58] Field of Search .................. 74/96, 579 E; 92/187, 92/189, 190, 191, 31

[56] References Cited

U.S. PATENT DOCUMENTS

| | | | |
|---|---|---|---|
| 3,500,724 | 3/1970 | Dolenc | 92/187 |
| 3,512,455 | 5/1970 | Obermeier | 92/187 |

FOREIGN PATENT DOCUMENTS 794282  4/1978  United Kingdom .................. 92/31

*Primary Examiner*—Kenneth Dorner
*Attorney, Agent, or Firm*—Kurt Kelman

[57] ABSTRACT

A reciprocating-piston drive mechanism comprises a reciprocating-piston assembly defining a spherical socket and including a piston body. A connecting rod is arranged for pivoting movement in a plane and has a ball head fitted in the spherical socket. A coupling between the ball head and the piston assembly is arranged to transform the pivoting movement of the connecting rod and ball head into a reciprocating rotation of the piston body about its axis. The coupling includes a first coupling member attached to, and non-rotatable relative to, the piston body, and a second coupling member attached to, and carried by, the ball head, the second coupling member engaging the first coupling member.

2 Claims, 3 Drawing Figures

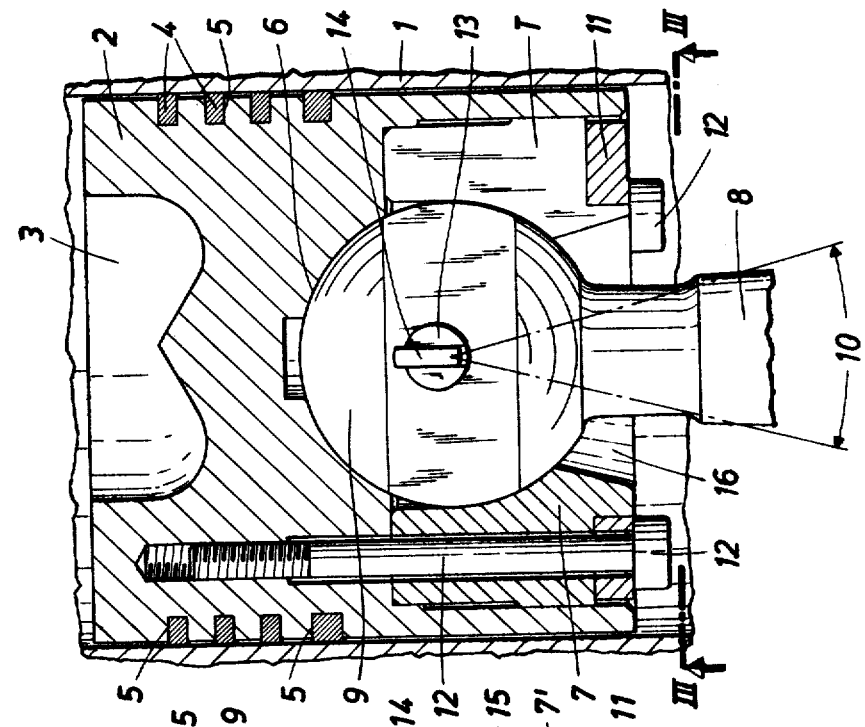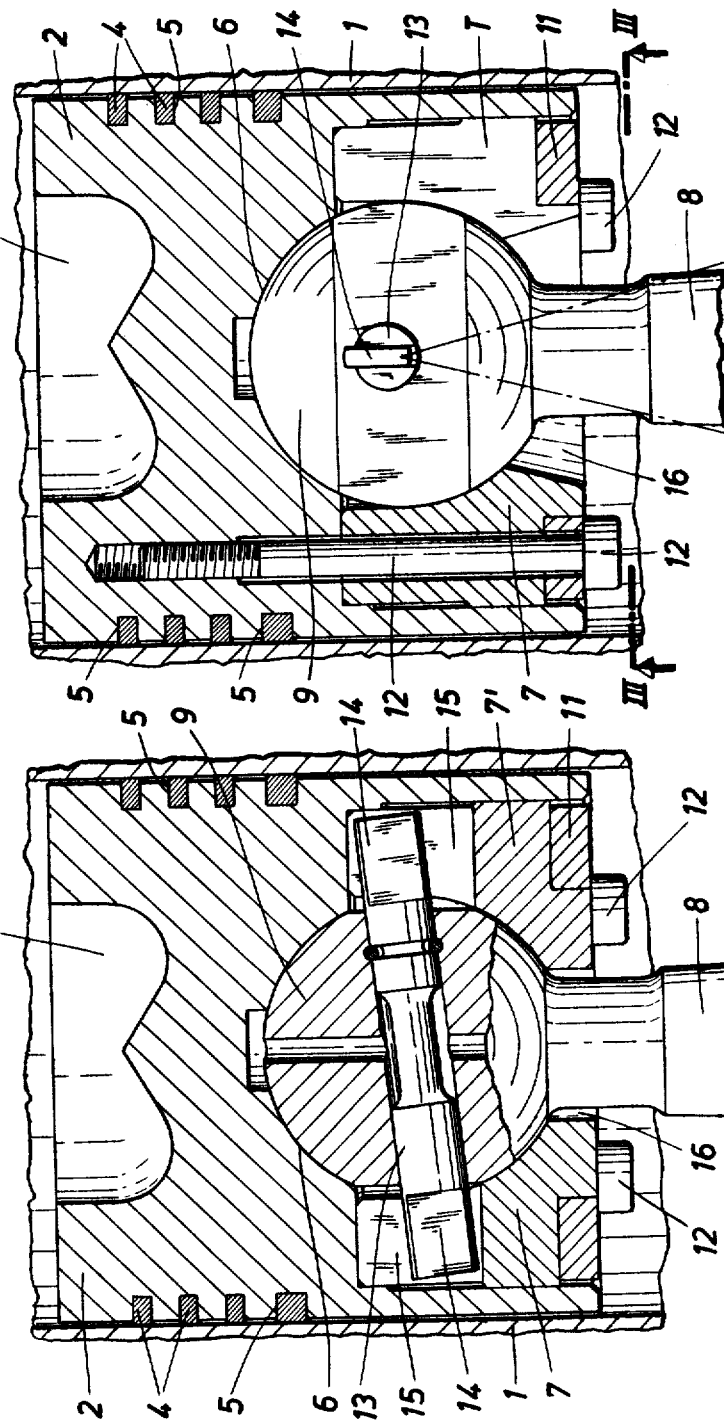

RECIPROCATING-PISTON DRIVE MECHANISM

This is a continuation-in-part of our copending U.S. Pat. application Ser. No. 887,502, filed Mar. 17, 1978 now abandoned.

The present invention relates to improvements in a reciprocating-piston drive mechanism for an internal combustion engine. Known mechanisms of this type comprise a piston body having an axis and defining a spherical socket, piston ring means carried by the piston body, and a connecting rod arranged for angular movement and having a ball head fited in the spherical socket of the piston body. A coupling between the ball head and the piston body is arranged to transform the angular movement of the connecting rod and ball head into a rotation of the piston body about the axis thereof.

U.S. Pat. No. 3,500,724, whose disclosure is incorporated herein by reference, relates to a reciprocating-piston drive mechanism of this type, wherein the coupling includes a coupling pin rotatably mounted in the ball head and extending transversely to the plane in which the connecting rod is angularly movable and at an oblique angle to the axis of the connecting rod. The coupling further includes a coupling member having slot means extending parallel to the axis of the piston body and adapted to receive respective flattened ends of the coupling pin. In this mechanism, the coupling member is angularly oscillated about the longitudinal axis of the piston body in response to the angular movement of the connecting rod. In order to ensure that the wear of the piston body is uniform and to decrease the total wear of the piston, it has previously been attempted to impart unidirectional rotation to the piston body. For this reason, the coupling member and piston body have had a slip connection or an overrunning clutch for rotation in only one direction when the piston body is adjacent to one or the other of its dead center positions. Such arrangements have the disadvantage that the elements of the overrunning clutch or unidirectional ratchet mechanism connecting the coupling member and piston body involve an increased structural expenditure and add to the weight so that the mass forces are increased. These increased mass forces result in an increase of the normal force exerted on the sliding surface of the cylinder so that the load on the piston body and the stresses on the bearings are increased as well as the noise which is generated. The rotation of the piston body only in one direction requires that the piston body is axially symmetrical and for this reason cannot be provided in the piston head with an unsymmetrical recess for combustion or for receiving the valve disc, although such design would be desirable in heavy-duty engines. Finally, the spherical socket means have a relatively wide opening for the access of the connecting rod because the opening must allow for the angular movement of the connecting rod in every rotational position of the piston body. Owing to this wide opening, the spherical socket has a much smaller surface so that excessively high pressures per unit of area may result.

It is an object of the invention to eliminate these disadvantages and to provide a reciprocating-piston drive mechanism which is of the kind described first hereinbefore and ensures that the structural expenditure is reduced as well as the weight of the piston body and which does not require an axially symmetrical design of the piston body.

This object is accomplished according to the invention with a coupling between the ball head and the piston assembly, which is arranged to transform the pivoting movement of the connecting rod and ball head into a reciprocating rotation of the piston body about the axis thereof. The coupling includes a first coupling member attached to, and non-rotatable relative to, the piston body and a second coupling member attached to, and carried by, the ball head, the second coupling member engaging the first coupling member.

The invention is based on the recognition that uniform and reduced wear can be ensured even when the piston body is not unidirectionally rotated, provided the piston rings are rotated only in one directon. It further recognized that it requires no slip connected or other unidirectional clutch between the piston rings and the piston to transform the reciprocating rotation of the piston due to its non-rotatable connection to the coupling member into a continuous unidirectional rotation of the piston rings. This is due to the fact that the piston rings are pressed against the side walls of the piston ring grooves housing them with different forces, due to the differences in the gas and mass forces in the range of the upper and lower piston dead center positions, so that the frictional engagement of the piston rings with the side walls of the grooves causes the rings to rotate with the piston body in the range of the upper dead center position while, in the lower dead center position, the friction between the piston rings and the surrounding cylinder wall predominates and prevents a reverse rotation of the piston rings. This results in the additional advantage that the gas forces exerted on the piston rings lying one over the other are not equal but decrease as the distance from the piston head increases so that the rings are rotated through different angles and the slots of the piston rings are not disposed on the same generatrix of the cylinder for an excessively long time. Even when internal combustion engines operate under heavy load, the short time for which two or more piston ring slots may be aligned in a direction which is parallel to the piston axis is not sufficient for an occurrence of deleterious hot spots. Because the coupling member performing an angular oscillation is non-rotatably connected to or forms part of the piston and no one-way coupling is provided, the structural expenditure and the weight of the piston are much decreased so that considerable advantages are afforded. Because the piston body oscillates only through an angle of a few degrees, the piston body may be nonsymmetrical with respect to its axis if, for example, the recesses for receiving the valve disc are enlarged to allow for that small angular movement. Finally, the ball head and spherical socket may even be offset from the axis of the piston body so that the piston body is tilted. Such tilting is desirable to reduce noise and to equalize the stresses on the piston body.

The above and other objects, advantages and features of this invention will become more apparent from the following detailed description of a now preferred embodiment thereof, taken in conjunction with the accompanying drawing wherein FIG. 1 is a sectional view taken on line I—I in FIG. 3 through the axis of the piston body and shows those parts of a reciprocating-piston drive mechanism which are essential for the invention, FIG. 2 is a sectional view taken on line II—II in FIG. 3 through the axis of the piston body, and FIG. 3 is a horizontal sectional view taken on line III—III in FIG. 2, the cylinder having been omitted.

Referring now to the drawing, the illustrated reciprocating-piston drive mechanism is shown to comprise a reciprocating-piston assembly defining a spherical socket and including piston body 2 having an axis and defining upper part 6 of the socket. Piston ring means is carried by the piston body and is shown to be comprised of a series of piston rings 4 defining in piston grooves 5 housing them a clearance which is too small to be represented in the drawing.

Connecting rod 8 is arranged for pivoting movement in a plane and has ball head 9 fitted in the spherical socket of piston assembly. As will be described in more detail hereinafter, a coupling is arranged between ball head 9 and piston assembly to transform the pivoting movement of the connecting rod and ball head, which is indicated by double-headed arrow 10 in FIG. 2, into a reciprocating rotation of piston body 2 about the axis thereof. The coupling includes first coupling member 7, 7' attached to, and non-rotatable relative to, piston body 2 and second coupling member 13 attached to, and carried by, ball head 9. The second coupling member engages the first coupling member.

In the illustrated embodiment, first coupling member 7, 7' is part of the piston assembly and a lower part of the socket is defined by the first coupling member. The first coupling member has slot-like bore 16 adjacent the socket and extending longitudinally in the plane wherein the connecting rod is pivoted. As shown in FIG. 3, bore 16 is of approximately cardioid cross section in a plane transverse of the pivoting plane. This design may be adopted because piston body 2 performs only a relatively small angular oscillation during the reciprocating rotation rather than a continuous unidirectional rotation. The use of a relatively narrow bore rather than a circular hole previously required for accommodating the connecting rod results in an increase of the bearing surface of the spherical socket so that the pressure per unit of area is decreased. The bearing surface of the spherical socket is increased further by imparting to slot-like bore 16 a cardioid cross section in exact adaptation of the two motions of the connecting rod and piston body. The longitudinal extension of bore 16 and the direction of the angular pivoting movement of connecting rod 8 are approximately the same.

Connecting rod 8 and bore 16 have a common axis in the plane in which the connecting rod is pivoted and first coupling member 7, 7' further has coupling slot means shown to consist of two slots 15, 15. Two side walls extending transversely to the plane and parallel to the axis of piston body 2 define each slot 15 and each slot is open to the spherical socket, as clearly shown in FIG. 1 wherein one of the side walls of each slot is seen in side view. In the illustrated embodiment, the first coupling member consists of two parts 7 and 7' defining joint T therebetween (see FIGS. 2 and 3) extending substantially in the plane in which connecting rod 8 is pivoted in the direction of arrow 10. The angular pivoting movement is effected by the rotation of a crankshaft (not shown) to which connecting rod 8 is connected, this angular pivoting movement being indicated in phantom lines in FIG. 2. As shown in FIGS. 1 and 2, the illustrated coupling member 7, 7' has an end face forming one end of the reciprocating-piston assembly and the assembly includes centering ring 11 disposed on the end face and engaging the two parts 7 and 7' of the first coupling member for holding them together. Screws 12 extend parallel to the axis of piston body 2 and secure the centering ring and the two coupling member parts to piston body 2.

While the two halves of the first coupling member could be welded or otherwise non-rotatably affixed to piston body 2, assembling them with the centering ring and screws results in a structure which may be readily assembled and taken apart and in which the centering ring bridges the clearance existing between the two coupling member parts and the piston body.

Because a part of the spherical socket is defined by the first coupling member, which thus performs a dual function, the structure is simple and may easily be assembled. The two-part coupling member enables the connecting rod to be fitted through the coupling member before the latter is mounted on the piston body over the ball head. A connecting rod could be fitted through a one-part coupling member only if the big end bearing of the connecting rod can be removed.

However, the coupling may have other designs. For instance, the first coupling member may be provided with a coupling pin and the ball head of the connecting rod may be provided with a slot for guiding the pin, or the coupling pin may extend in the crank plane in a direction normal to the axis of the connecting rod and the slot in the surrounding coupling member may be oblique.

In the illustrated embodiment, the second coupling member consists of coupling pin 13 rotatably mounted in ball head 9 and extending transversely to the plane wherein connecting rod 8 is pivoted, at an oblique angle (see FIG. 1) to the axis of the connecting rod. The coupling pin has respective flattened ends 14, 14 received and fitted in coupling slots 15, 15 wherein the ends of the coupling pin hold it against rotation relative to the reciprocating-piston assembly. The coupling pin is mounted rotatably in a diametrical bore extending through ball head 9. Accordingly, coupling pin 13 extends transversely to the plane of the angular pivotal movement (arrow 10) of connecting rod 8 and the axis of the coupling pin passes through the center of ball head 9.

Owing to this coupling arrangement, when the crankshaft is rotated to pivot connecting rod 8 and ball head 9 in the direction of double-headed arrow 10, flattened ends 14 of coupling pin 13, which are keyed to coupling slots 15 in the piston assembly, are similarly angularly oscillated in opposite directions, each coupling pin end being positioned at opposite sides of the center of ball head 9. Looking at ball head 9 along the axis of piston body 2, the angular oscillation of flattened coupling pin ends 14 is seen as a pivoting movement of the axis of coupling pin 13 about the axis of piston body 2.

Since the coupling pin is thus keyed to the first coupling member 7, 7' and the latter is non-rotatable relative to piston body 2, this body is reciprocated according to the pivoting movement of the axis of the coupling pin. In every position of the first coupling member, the two side walls defining each coupling slot 15 are parallel to the axis of piston body 2. Therefore, coupling pin 13 must be rotatably mounted in the diametrical bore of ball head 9 to ensure that flattened coupling pin ends 14 remain aligned with the side walls, i.e. parallel to the axis of the piston body, regardless of the angular position of connecting rod 8 and coupling pin 3. If the coupling pin were non-rotatable with respect to the ball head, the coupling pin ends would have to be cylindrical to fit in coupling slots 15 in every position of the pivotally moving connecting rod and coupling pin.

As will be appreciated from the above description, pivoting of connecting rod 8 in the direction of double-headed arrow 10 in a plane, which is shown to pass through the axis of piston body 2, will cause reciprocating rotation of the piston body about the axis.

What is claimed is:

1. A reciprocating-piston drive mechanism comprising
   (a) a reciprocating-piston assembly defining a spherical socket and including
      (1) a piston body having an axis and defining at least part of the socket, and
      (2) piston ring means carried by the piston body,
   (b) a connecting rod arranged for pivoting movement in a plane and having
      (1) a ball head fitted in the spherical socket of the piston assembly, and
   (c) a coupling between the ball head and the piston assembly, the coupling being arranged to transform the pivoting movement of the connecting rod and ball head into a reciprocating rotation of the piston body about the axis thereof and the coupling including
      (1) a first coupling member attached to, and non-rotatable relative to the piston body, and forming part of the piston assembly, the first coupling member consisting of two parts defining a joint therebetween extending substantially in the plane and has an end face forming one end of the assembly, the first coupling member defining a part of the socket and having a bore adjacent the socket and extending longitudinally in the plane, the connecting rod and the bore having a common axis in the plane, and the first coupling member further having a coupling slot means extending transversely to the plane and parallel to the axis of the piston body and the coupling slot means being open to the spherical socket, and
      (2) a coupling pin rotatably mounted in the ball head and extending transversely to the plane at an oblique angle to the axis of the connecting rod, the coupling pin having respective ends glidingly received in the coupling slot means,
   (d) the assembly including a centering ring disposed on the end face and engaging the two parts of the first coupling member for holding them together, and screws extending parallel to the axis of the piston body and securing the centering ring and the two parts to the piston body.

2. The reciprocating-piston drive mechanism of claim 1, wherein the bore is of approximately cardioid cross section.

* * * * *